United States Patent
Vichniakov et al.

(10) Patent No.: US 11,754,102 B2
(45) Date of Patent: Sep. 12, 2023

(54) METHOD FOR PRODUCING A COMMON CONNECTING OPENING IN TWO COMPONENTS, AT LEAST ONE OF WHICH IS MADE FROM A PLASTICALLY DEFORMABLE MATERIAL

(71) Applicant: Airbus Operations GmbH, Hamburg (DE)

(72) Inventors: Alexei Vichniakov, Hamburg (DE); Nico Pahmeyer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 554 days.

(21) Appl. No.: 16/749,051

(22) Filed: Jan. 22, 2020

(65) Prior Publication Data
US 2020/0248732 A1    Aug. 6, 2020

(30) Foreign Application Priority Data

Jan. 31, 2019   (DE) .......................... 102019102469.2

(51) Int. Cl.
*F16B 5/00* (2006.01)
*F16B 13/08* (2006.01)
*F16B 19/10* (2006.01)

(52) U.S. Cl.
CPC ........ *F16B 5/0096* (2013.01); *F16B 13/0841* (2013.01); *F16B 2019/1009* (2013.01)

(58) Field of Classification Search
CPC ......... Y10T 29/49826; Y10T 29/49833; Y10T 29/49835; Y10T 29/49863; Y10T 29/49908; Y10T 29/49909; Y10T 29/49915; B29C 66/7394; B29C 66/742; B29C 66/81417; B29C 66/81429; B29C 65/72; B29C 65/02; B29C 66/1122; B29C 66/21; B29C 66/41; B29C 66/7392;
(Continued)

(56) References Cited

U.S. PATENT DOCUMENTS

| 10,822,120 B2* | 11/2020 | Linde ................ B29C 66/0222 |
| 2010/0186900 A1* | 7/2010 | Christ ................ B23K 20/129 228/2.1 |

(Continued)

FOREIGN PATENT DOCUMENTS

| DE | 102007030806 A1 | 1/2009 |
| DE | 102009013265 A1 | 9/2010 |

(Continued)

OTHER PUBLICATIONS

German Search Report; priority document.
German Office Action; priority document.

*Primary Examiner* — Sarang Afzali
*Assistant Examiner* — Darrell C Ford
(74) *Attorney, Agent, or Firm* — Greer, Burns & Crain, Ltd.

(57) ABSTRACT

A method is provided for producing a common connecting opening in two components, at least one of which is made from a plastically deformable material. In the method, at least the edge region of a first prefabricated opening of the first component is softened in order subsequently to introduce a mandrel which displaces the material softened by the heating so that a common connecting opening having a predetermined diameter is obtained.

6 Claims, 7 Drawing Sheets

(58) Field of Classification Search
CPC ... B29C 66/8322; B29C 66/71; B29C 66/721;
B29C 66/7212; B29C 66/72143; B29C
66/73921; B29L 2031/30; B29L
2031/3064; B29L 2031/3076; F16B 5/08;
F16B 17/008; F16B 5/04
USPC ...... 29/428, 525, 432, 432.1, 446, 505, 506,
29/509
See application file for complete search history.

(56) References Cited

U.S. PATENT DOCUMENTS

| | | | |
|---|---|---|---|
| 2015/0167723 | A1 | 6/2015 | Flock et al. |
| 2016/0341234 | A1 | 11/2016 | Germann et al. |
| 2017/0037887 | A1* | 2/2017 | Savoyat ................. F16B 5/04 |
| 2018/0094660 | A1* | 4/2018 | Mayer .................. F16B 19/086 |
| 2019/0061977 | A1* | 2/2019 | Linde ................ B29C 66/73921 |
| 2020/0025590 | A1* | 1/2020 | Ito .............................. F16B 5/04 |
| 2020/0215765 | A1* | 7/2020 | Murmann ............... F16B 19/06 |

FOREIGN PATENT DOCUMENTS

| | | | | |
|---|---|---|---|---|
| DE | 102013211580 | A1 | | 12/2013 |
| DE | 102017119856 | A1 * | 2/2019 | ............ B29C 65/18 |
| DE | 102017119856 | A1 | | 2/2019 |
| WO | 2004098810 | A1 | | 11/2004 |
| WO | 2013185980 | A1 | | 12/2013 |

* cited by examiner

METHOD FOR PRODUCING A COMMON CONNECTING OPENING IN TWO COMPONENTS, AT LEAST ONE OF WHICH IS MADE FROM A PLASTICALLY DEFORMABLE MATERIAL

CROSS-REFERENCES TO RELATED APPLICATIONS

This application claims the benefit of the German patent application No. 102019102469.2 filed on Jan. 31, 2019, the entire disclosures of which are incorporated herein by way of reference.

FIELD OF THE INVENTION

The invention relates to a method for producing a common connecting opening in two components, at least one of which is made from a plastically deformable material. The invention furthermore relates to a system for producing such a connecting opening.

BACKGROUND OF THE INVENTION

Components which are connected to one another by form-fit connecting means, for example rivets or bolts, requires suitable connecting openings in order to pass the connecting means through and in order to establish an at least form-fit connection. These openings may be produced by various methods. For example, the components to be connected to one another may be placed flush against one another in order subsequently to bore through the two components together so that a continuous bore through the two components is produced. If one of the components is fiber-reinforced, a disadvantage of this procedure could be that individual fibers might be cut through partially during the boring process. When different materials of the two components are used, because of different material requirements it could also be difficult, with the same tool, to bore precisely through the two components and/or to fully remove the excavated material.

It is furthermore known to produce connecting openings directly during the production of the components in question. If one of the components is fiber-reinforced, it would be possible to divert the fibers correspondingly around the connecting openings. Because of production-related dimensional tolerances, however, it is unlikely that the connecting openings of the two components will be entirely aligned with one another when the components are placed on one another.

SUMMARY OF THE INVENTION

It is therefore an object to provide an alternative and improved method for producing a common connecting opening, through which a connecting means can be passed, in two components, the components having separately produced openings.

A method is provided for producing a common connecting opening in two components, at least one of which is made from a plastically deformable material, the method comprising the steps of providing a first component made of a plastically deformable material, the first component having a first opening, providing a second component having a second opening, assembling the first component and the second component so that the first opening and the second opening lie on one another, enclosing the first component and the second component between two restricting bodies in an edge region around the respective opening, softening the material at least of the edge region of the first component, introducing a mandrel into the openings so that softened material moves between the two edge regions and surrounds the mandrel in order to provide a common connecting opening, and setting the material, the mandrel having an outer diameter which corresponds to a target diameter of the common connecting opening.

The term "common connecting opening" is to be understood as an opening which is passed through the two components to be connected to one another and preferably has a regularly shaped inner contour. Preferably, the inner diameter is constant over the entire axial extent of the connecting opening, so that an inserted connecting means can establish a defined surface contact with the inner contour and radial edge regions.

Initially, a first component made of a plastically deformable material having a first opening is provided. The provision of the first component may comprise a production method for producing the first component. It is conceivable for the first component to be made from a plastic material, for instance from a thermoplastic. It would, however, also be conceivable to make the first component from a metallic material which can be softened by heating. As indicated above, in particular the plastic material may be fiber-reinforced and constructed from a plurality of layers of reinforcing fibers, which are embedded in a matrix made of a thermoplastic.

The first component could comprise thermoplastic (PA, PE, PEI, PPS, PEKK, PEEK, PAEK, LM PAEK or the like) and be configured with or without fiber reinforcement. Metallic materials may furthermore be provided, for instance Al, Mg, Ti or the like. These may also be configured with a without fiber reinforcement. Besides the thermoplastics and metallic materials mentioned above, the second component could also comprise thermosets, in each case with or without fiber reinforcement.

The first opening need not necessarily be produced by a machining (boring) method, but may also involve omitting the opening region. It is, for instance, conceivable that, in particular when using fiber-reinforced plastics, a kind of space holder which is likewise in the form of a mandrel or a similar element, is arranged at the intended region of the first opening during the production of the first component. Following this, the space holder is surrounded by the fibers and fixed by matrix material. After production of the first component, the space holder is removed. In this way, it is possible to ensure that all the reinforcing fibers are guided nondestructively around the first opening. The provision of the second component may be carried out in a similar way if the second component also consists of a fiber-reinforced material. At the start of the method according to the invention, two components are consequently provided, each of which has an opening. The second component may consist of almost any desired material which is capable of receiving softened material from the edge region of the first opening by means of the second opening.

When the two components lie on one another, the first opening and the second opening also lie on one another. For reasons mentioned above, it may therefore be reckoned that there is an offset between the two openings.

As a further preparatory step, the first component and the second component are enclosed between two restricting bodies in an edge region of the respective opening. Consequently, on one side of the combination of the first and second components there is a first restricting body, while the second restricting body is arranged on the opposite side of this combination. The two components to be connected to one another are located flush between the two restricting bodies. The two restricting bodies are configured and adapted so that only an edge region around the respective opening is in surface contact with the respective restricting body. The surface contact prevents the material emerging from a connecting region and, for instance, forming a bead.

Action is carried out at least on the edge region of the first component, so that at least the material in the edge region of the first component softens. The action may be carried out by direct or indirect heating and comprise hot air, induction or irradiation with visible light, infrared light or laser radiation, or alternatively by friction, for example rapid rotation of a suitable tool. This tool may also be the mandrel or the connecting element, if the latter fulfills the function of the mandrel and remains in the common connecting opening (see below). In this way, at least the material of the first component can be shaped. Heating could, for instance, be carried out in such a way as to reach a predetermined target temperature, at which the material at least in the short term does not quite yet change its shape, i.e., does not flow apart. Without an externally acting mechanical influence, the position and configuration of the first component in the edge region can be substantially constant. By the introduction of the mandrel into the openings, the material which is located between restricting bodies is displaced by the mandrel. If the material is softened sufficiently, it can be moved very easily by the mandrel.

The radially internal located material may be moved uniformly by the mandrel inside the free volume of the openings of the components. The two openings are not entirely aligned, the softened material may consequently be displaced inside the available space so that the material bears flush on a lateral surface of the mandrel. In this position, the material may cool and thereby solidify, after which the mandrel may be removed from the openings. As a result, the common connecting opening is obtained, which extends uniformly through the two openings of the two components and is preferably surrounded uniformly by material at least of the first component.

The mandrel may have a longitudinal extent which, for example, tapers on one side. The mandrel may substantially be configured solidly, and preferably have a lateral surface which is cylindrical at least in sections. In order to achieve indentation of the common connecting opening, however, the mandrel may also be equipped with a widening end which leads to an indentation that is, for example, conical.

The particular advantage of this procedure resides in the harmonious deformation of the material of at least one of the components in order to compensate for tolerance-related dimensional discrepancies of separately produced bores while simultaneously ensuring a good fit. If fiber-reinforced thermoplastics are used, mechanical effects on the reinforcing fibers may furthermore be avoided. At the same time, it is possible to use standardized connecting means which do not need to take into account a possible offset between two openings of two components to be connected.

Furthermore, when carrying out the method according to the invention, almost no contamination by swarf, dust and lubricants occurs, and the outlay for cleaning the components to be connected to one another is minimized. This is particularly expedient when installing systems and cabin components in aircraft. Expedient use of prefabricated openings may therefore be carried out with the method according to the invention.

By the softening of the material and the introduction of the mandrel, material is moved inside the edge regions of the two components in order to bring it into the shape, defined by the mandrel, of the new connecting opening. Since the material is to be assumed to be incompressible, and an unchanged material thickness after the introduction of the mandrel is also assumed to be desired, the calculation of the required diameters of the openings may be carried out on the basis of a required constant volume. To this end, for instance, the volume of the first opening may be denoted as V1, the volume of the second opening as V2, and the volume of the connecting opening as Vf (here, "f" stands for the term "fitting"). These three volumes then have the following relation:

$$Vf = V1 + V2 = t1 \cdot \pi \cdot R12 + t2 \cdot \pi \cdot R22$$

Where R1 is the radius of the first connecting opening, R2 is the radius of the second connecting opening, t1 is the material thickness of the first component in the first edge region, and t2 is the material thickness of the second component in the second edge region.

The volume Vf of the connecting opening is determined by a radius Rf of the mandrel. This may be predetermined in order to take into account desired connecting elements, which, in particular, are characterized by a particular outer diameter. A required size of the second opening in the form of R2 is then determined by a selected size of the first opening and a desired size of the connecting opening:

$$R_2 = \sqrt{\frac{(t_1 + t_2) \cdot R_f^2 - t_1 \cdot R_1^2}{t_2}}$$

If, in addition to a purely cylindrical connecting opening, an indentation is desired, which is, for example, configured as a conical widening of the connecting opening, the additional volume thereof is to be taken into account. It is to be calculated according to conventional mathematical methods. Any damping effects, internal deformations, and the adhesion of material residues on a mandrel to be removed, may furthermore be taken into account on the basis of empirical values.

The production of the common connecting opening may be carried out for many types of materials. It is, however, necessary for at least the first component to comprise a plastically deformable material which can be softened and can be displaced by the mandrel. The material of the second component may, however, vary in wide ranges. Materials with or without reinforcing fibers are suitable for the material of the first component. The reinforcing fibers may be short or long fibers. The matrix material in which the reinforcing fibers are embedded may be thermoplastic or metallic. Thermoplastics or metals, or metal alloys, which do not comprise reinforcing fibers may also be envisaged. The second component may consist of both these materials and thermosets or elastomers. Metal components may consequently be connected to metal components, for instance aluminum components to titanium components. Connecting openings between thermoplastics and thermoplastics may be envisaged, for example PEKK and PEKK components. Further thermoplastic materials may also be highly suitable, for instance PA, PEI, PPS, PAEK, LM PAEK and the like. Connections between thermoplastic components and thermoset components, or any other combinations, may furthermore be envisaged. It is necessary to take care that a thermal action for softening the material of the first component does not compromise the integrity of the second component.

Because of the wide range of usable materials, the method according to the invention may be employed for many applications. Particularly in aircraft and automotive engineering, for rail vehicles and watercraft, prefabricated parts may be processed reliably in order to compensate for tolerance-related dimension discrepancies of connecting openings during final assembly without modifications of the mechanical properties.

In one advantageous embodiment, the softening of the material comprises softening of the material of the edge regions of the first component and the second component. This is expedient in particular when the two components are made from a plastically deformable material. In one advantageous embodiment, the provision of the second component therefore comprises the provision of the second component made of a plastically deformable material.

Preferably, the method comprises heating of the mandrel. The heating of the mandrel results in heating, in particular, of a lateral surface of the mandrel, so that a uniform heating effect is carried out on the material when the mandrel is introduced into the openings. The uniform heating leads to uniform softening of the material and improves the deformation. In addition thereto, setting may be counteracted. If the components are made from the same material or at least very similar materials, an additionally heated contact surface of the mandrel may furthermore lead to welding of the two components in the region of the connecting opening to be produced. It would be conceivable to provide the mandrel with a higher temperature than the edge regions of the two components, so that an improved material fit is achieved. The heating of the mandrel may be carried out using an electrical heating resistor, the introduction of hot air, carrying out an ultrasound vibration, generating radiant heat inside the mandrel or directly outside, or the action of other, in particular external, heat sources.

In one advantageous embodiment, the first opening has a smaller diameter than the second opening. As mentioned above, the mandrel is introduced through the first opening and subsequently reaches the second opening. The mandrel is very likely not directly aligned with the first opening when it is driven into it. Consequently, the softened material of the first component must be displaced laterally and in the direction of the second component so that it accumulates in the region of the second opening and around the mandrel. The first opening then assumes an inner diameter which corresponds to the outer diameter of the mandrel. Because of the restricting bodies, which are in surface contact with the edge regions of the components, the material can be displaced only into the region of the second opening.

In another advantageous embodiment, the mandrel outer diameter is greater than a diameter of the first opening and less than a diameter of the second opening. The first opening is therefore expanded to the outer diameter of the mandrel and thereby brought into alignment with the mandrel. The amount of material which is displaced towards the second opening may furthermore be determined by the difference in diameter of the first opening and the mandrel. Consequently, with a smaller first diameter and greater second diameter, relatively large position tolerances between the openings may be compensated for. A socket-like section is furthermore formed radially inside the second opening from the material of the first component.

According to one preferred embodiment, the first opening has a first opening radius, the second opening has a second opening radius, and the mandrel has a mandrel outer radius, the first opening radius, the second opening radius and the mandrel outer radius being dimensioned in such a way that, when the mandrel is introduced, the first component, the second component and the mandrel are in flush surface contact with one another with an unchanged material thickness of the components. Accordingly, with a constant material thickness, the entire space defined by the openings is filled with softened material so that, as a result, the common connecting opening is finally obtained with a predetermined inner diameter.

Preferably, the mandrel is driven from a cavity arranged in the first restricting body into a second cavity of the second restricting body. The mandrel may therefore be guided precisely to a desired distance. Reinforcing fibers which are moved laterally by the mandrel not in this case influence the movement direction of the mandrel. The second cavity is in this case configured in such a way that only the mandrel can enter the second cavity. The material which is displaced laterally by the mandrel on the other hand, should be retained by the surface contact between the restricting bodies and the respectively adjacent component, so that a bead is not formed.

In one particularly advantageous embodiment, the method furthermore comprises the use of a connecting element as the mandrel, which remains in the common connecting opening after the setting of the material. In this way, for instance, a rivet or a bolt may be used directly to provide the common connecting opening, in order to subsequently remain there and subsequently be fastened.

In a similar way thereto, the invention furthermore relates to a system for producing a common connecting opening in two components, at least one of which is made from a plastically deformable material, comprising a first restricting body, a second restricting body, and a mandrel, wherein the first restricting body comprises a first restricting surface and a first cavity, in which the mandrel is movably guided perpendicularly to the first restricting surface, and wherein at least the first restricting body is configured to soften the material in an edge region of at least one adjacent component around the openings.

In one advantageous embodiment, the second restricting body comprises a second cavity, which is configured to receive the mandrel. The mandrel is consequently guided into the second cavity after passing through the openings. This second cavity is preferably adapted to the shape of the mandrel so that the mandrel is guided further.

In one likewise advantageous embodiment, the mandrel is heatable. In this way, in particular, welding of the two components may be achieved in the region of the connecting opening.

It may be expedient for the first restricting body and the second restricting body to be arranged on a tool holder, the tool holder being configured to hold the restricting bodies releasably in a clamping position in which the two components are pressed flush against one another. The restricting bodies may consequently grip the components in the manner of pliers and maintain this gripping position. This may be carried out using electrical, hydraulic or pneumatic means, and/or by latching. In this position, heating of the material and subsequent driving of the mandrel are facilitated.

BRIEF DESCRIPTION OF THE DRAWINGS

Other features, advantages and application possibilities of the present invention may be found from the following description of the exemplary embodiments and figures. In this case, all features described and/or depicted per se and in any combination form the subject-matter of the invention, independently of their formulation in the individual claims or the back-referencing of the latter. In the figures, references which are the same furthermore denote objects which are the same or similar FIG. 1 shows two components, a second restricting body and a mandrel in a three-dimensional view.

12a shows the two openings and the connecting opening in a lateral section.

Figure 12A:
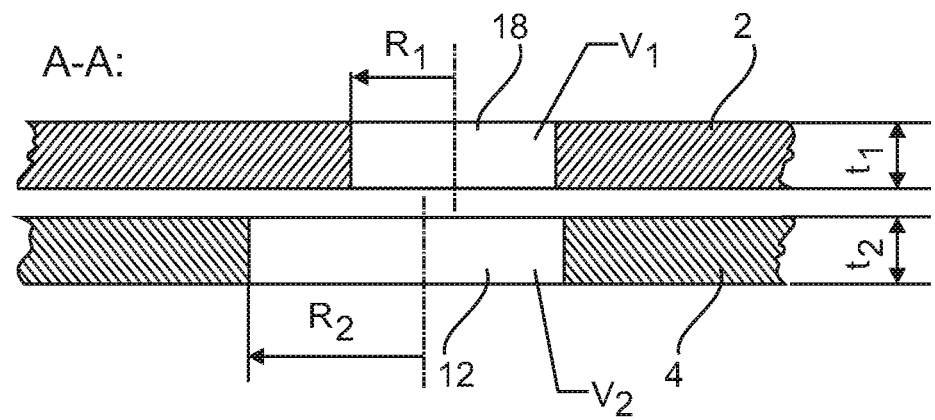
Figure 12B:
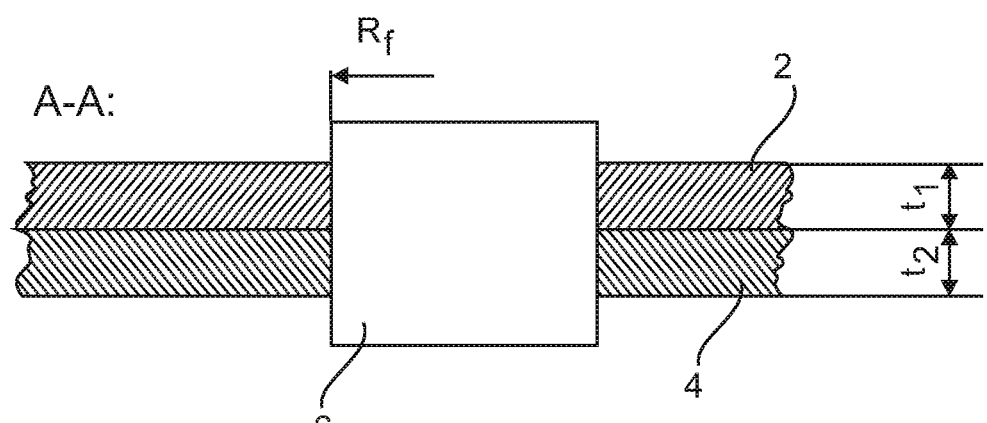

FIG. 12b also shows the two openings and the connecting opening in a lateral section.

Figure 12C:
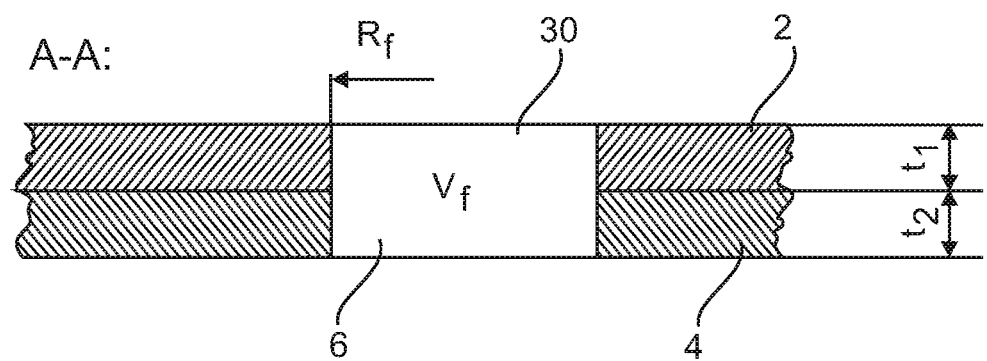

FIG. 12c additionally shows the two openings and the connecting opening in a lateral section.

Figure 13A:
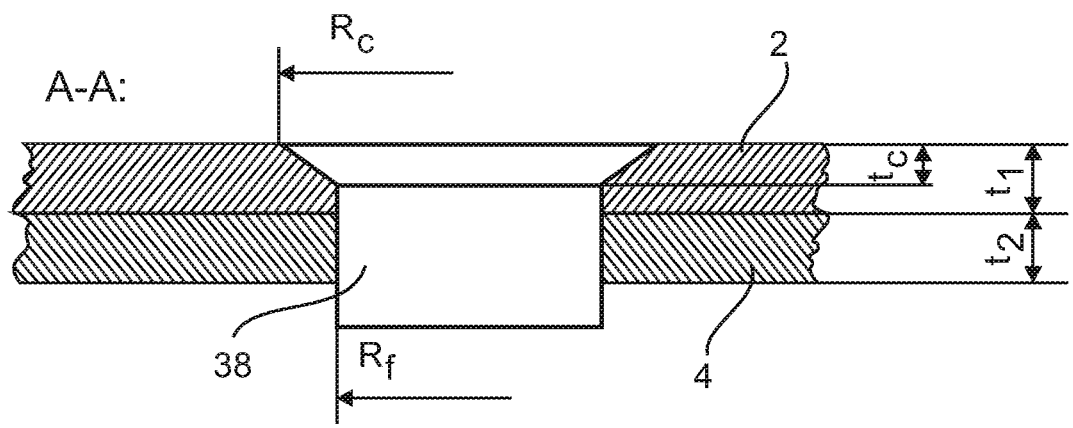

FIG. 13a shows the connecting opening with an indentation in a lateral section.

Figure 13B:
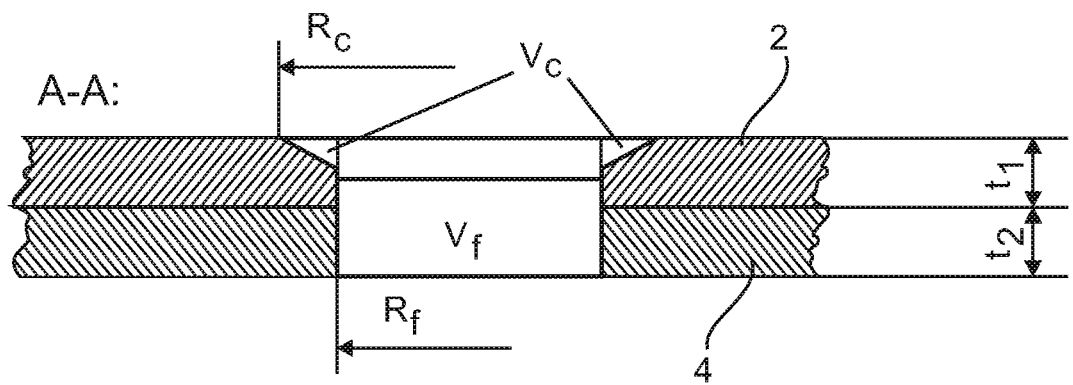

FIG. 13b also shows the connecting opening with an indentation in a lateral section.

Figure 14A:
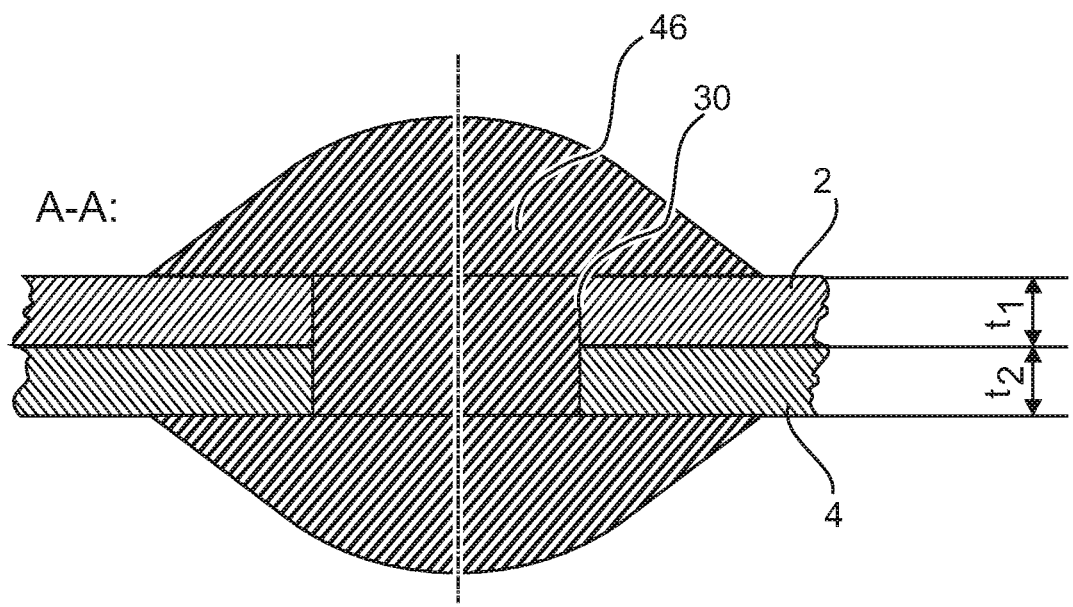

FIG. 14a shows a first connecting opening with a connecting element arranged therein.

Figure 14B:
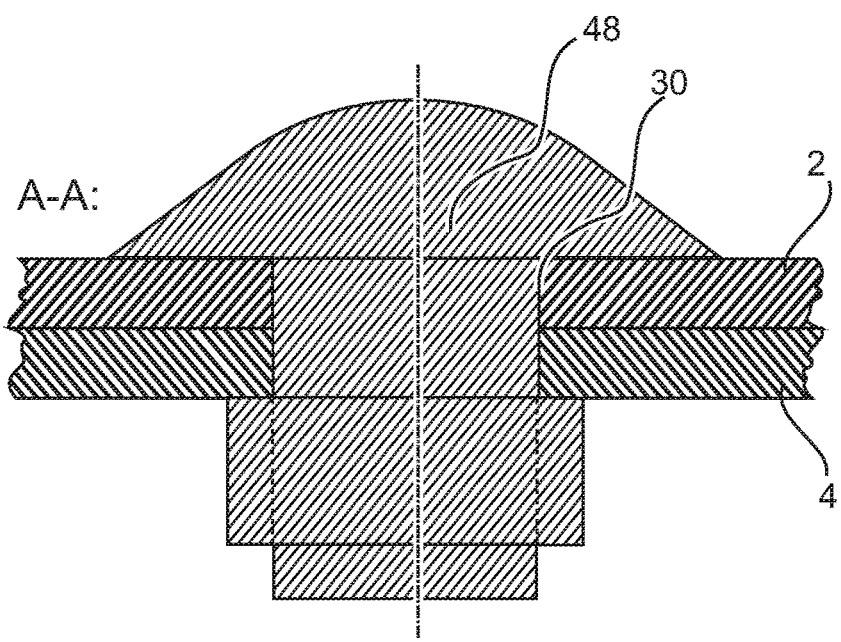

FIG. 14b shows a second connecting opening with a connecting element arranged therein.

Figure 14C:
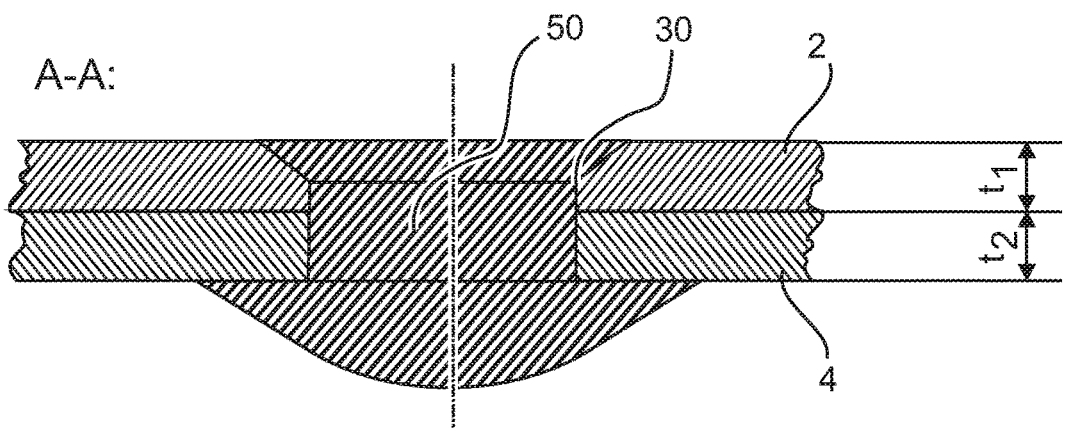

FIG. 14c shows a second connecting opening with a connecting element arranged therein.

Figure 14D:
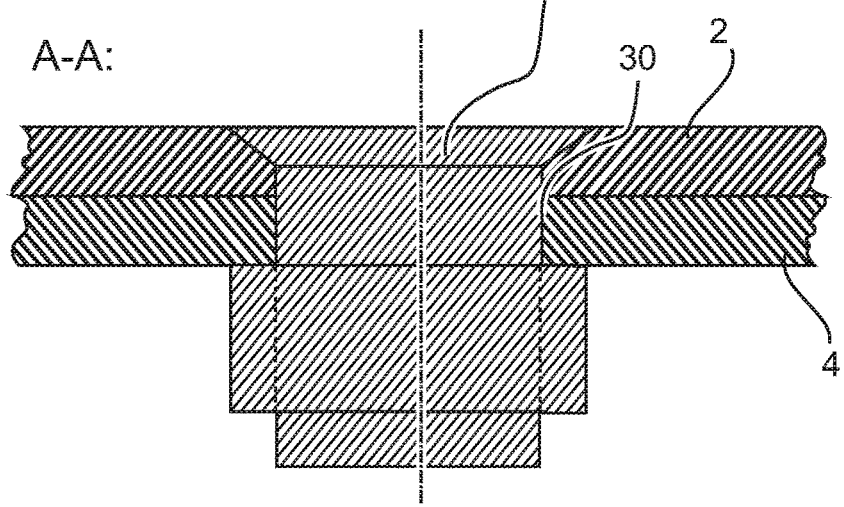

FIG. 14d shows a second connecting opening with a connecting element arranged therein.

DETAILED DESCRIPTION OF THE PREFERRED EMBODIMENTS

Figure 1:
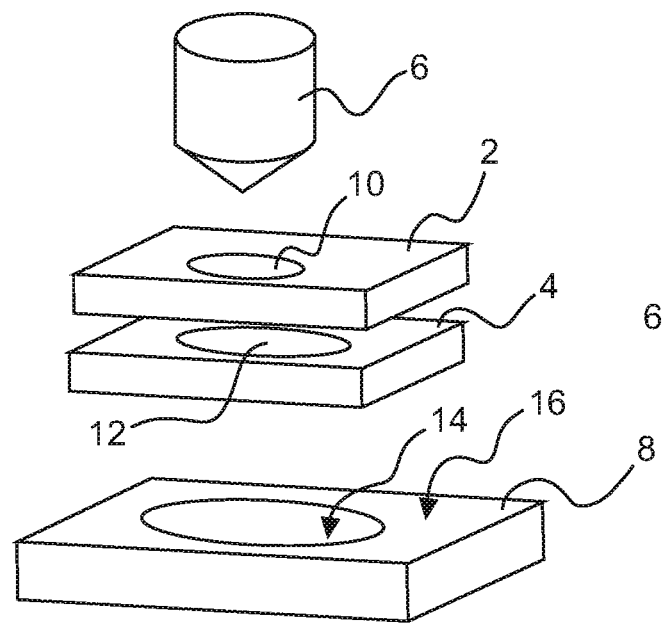

FIG. 1 shows a first component 2 and a second component 4, which in this case, by way example, are made from a fiber-reinforced plastic. The components 2 and 4 may consequently comprise reinforcing fibers in the form of short or long fibers, for instance carbon fibers, which are embedded in a matrix made of a thermoplastic. This may for instance comprise polyamide, polyetherimide, PEKK, PEEK, PAEK, PPS or other suitable materials.

FIG. 1 furthermore shows a mandrel 6, which is guided in a first restricting body (not represented here) in a first cavity formed therein, so that it can be moved in the axial direction. The mandrel 6 is configured by way of example as a cylindrical body having a conically pointed end. A second restricting body 8 is arranged on an opposite side of the second component 4.

The first component 2 has a first opening 10, while a second opening 12 is provided in the second component 4. The openings 10 and 12 are shown as circular openings, which might be suitable for the production of a connecting opening, but is not absolutely necessary, as will be explained below. The second restricting body 8 comprises a second cavity 14, which is surrounded by a second restricting surface 16. For example, the two components 2 and 4 are respectively represented as being flat. Each component 2, 4 may of course also have a much more complexly shaped structure.

Figure 2:
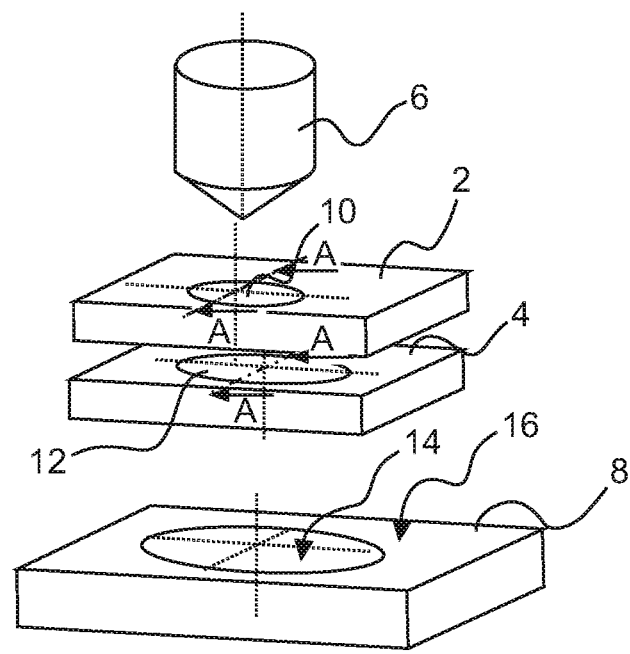
FIG. 2 shows the view of FIG. 1 with additional markings to illustrate position discrepancies.

For example, the first opening 10 is smaller than the second opening 12. Furthermore, the two openings 10 and 12 do not lie concentrically above one another, but form a lateral offset. This may be attributable to production-related dimensional tolerances. Provision is made to integrate the openings 10, 12, during the production of the components 2, 4, directly into one another. Especially in the case of relatively large dimensions of the components 2 and 4, it is conceivable that an offset may be fully avoided. The offset is denoted in more detail in FIG. 2 with the aid of marking lines. Both the first opening 10 and the second opening 12 are arranged off-center with respect to the mandrel 6.

Figure 3:
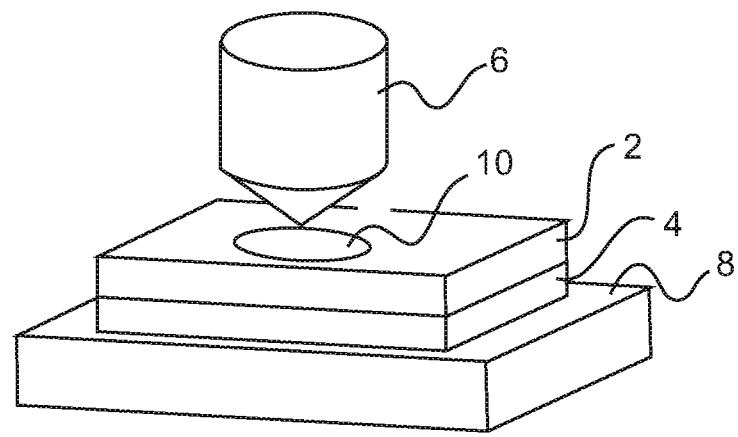
FIG. 3 shows the two components in a position lying on one another with a mandrel brought close to the first opening.

As represented in FIG. 3, as a preparatory step the two components 2 and 4 are placed on one another so that the openings 10 and 12 lie on one another. The second restricting body 8 is furthermore placed directly below the second opening 12 so that the second opening 12 is located over the second cavity 14. The mandrel 6 is in a starting position directly above the first opening 10.

Figure 4:
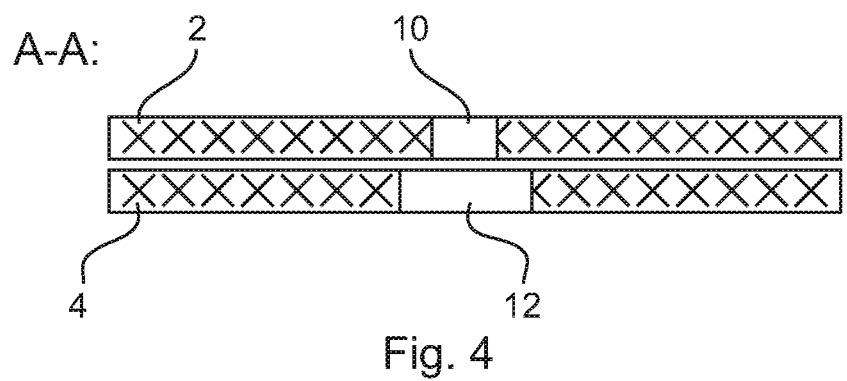
FIG. 4 shows the two components in a lateral section.

FIG. 4 shows a sectional representation in which the two openings 10 and 12 lie above one another. The difference in the diameters of the two openings 10, 12 is in this case clear. By way of example, however, the material thicknesses of the two components 2 and 4 are selected to be substantially equal. The aim is to provide, with the two openings 10 and 12, a uniformly shaped and stepless common connecting opening through which a connecting means can be passed and fastened.

Figure 5:
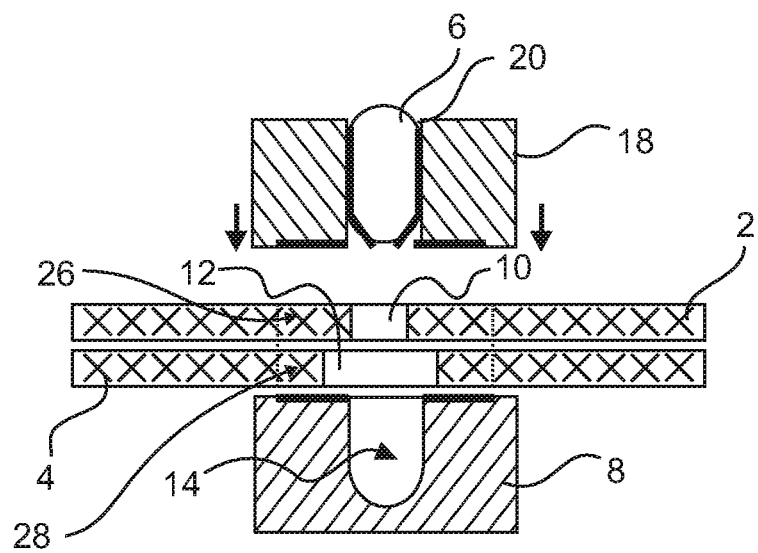
FIG. 5 shows the two components, two restricting bodies and the mandrel in first positions in a lateral section.

FIG. 5 shows an extended sectional representation with the second restricting body 8, which is arranged flush next to the second component 4 at the second opening 12. This leads to surface contact between the second restricting surface 16 and the second component 4. Arranged on the opposite side, there is furthermore a first restricting body 18, which in a similar way to the second restricting body 8 comprises a first cavity 20 in which the mandrel 6 is guided. The second restricting body 8 and the first restricting body 18 are preferably oriented with one another in such a way that the cavities 14 and 20 are aligned with one another. As is represented with the aid of movement arrows, the first restricting body 18 is driven onto the first component 2 in the region of the first opening 10.

Figure 6:
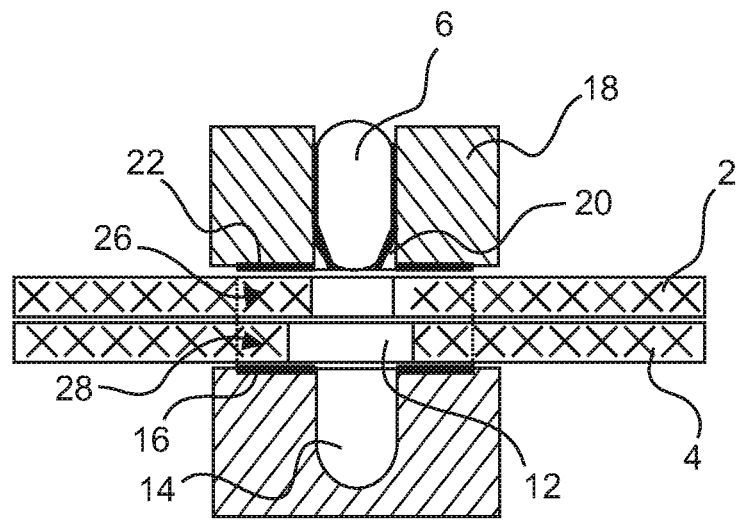
FIG. 6 shows, in a lateral section, the two components, two restricting bodies and the mandrel of FIG. 5 in a second position.
Figure 7:
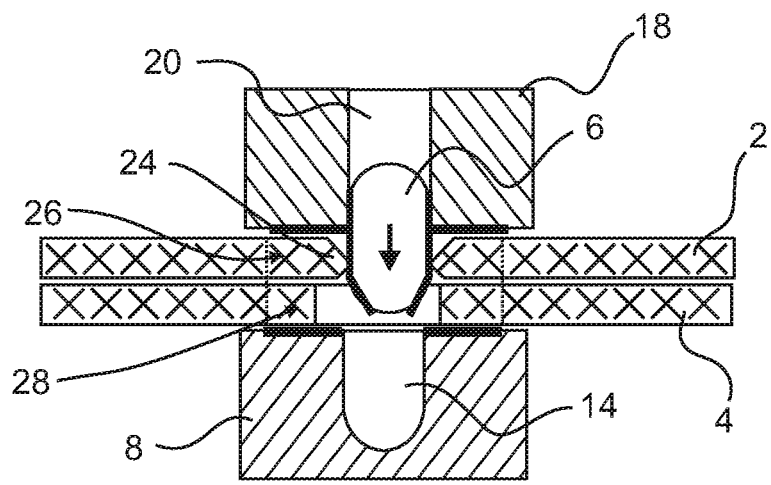
FIG. 7 shows, in a lateral section, the two components, two restricting bodies and the mandrel of FIG. 5 in a third position.
Figure 8:
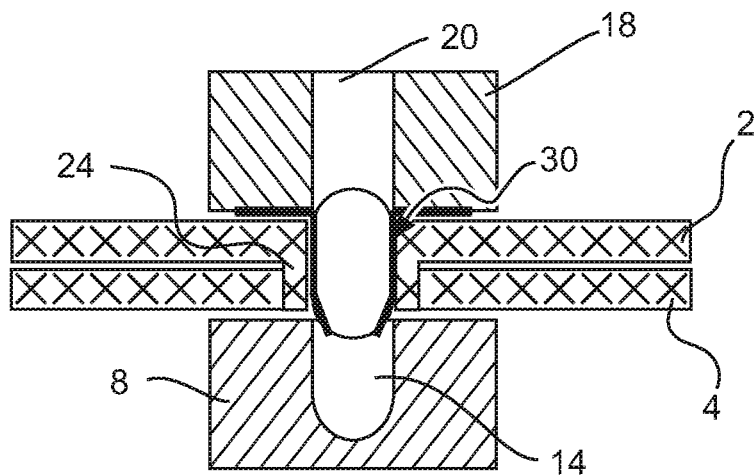
FIG. 8 shows, in a lateral section, the two components, two restricting bodies and the mandrel of FIG. 5 in a fourth position.

The resulting arrangement is represented in FIG. 6. In this case, the mandrel 6 is still fully in the first cavity 20 and the openings 10 and 12 are enclosed between the cavities 14 and 20. The two restricting bodies 8 and 18 may likewise exert a mechanical pressure on the components 2 and 4, so that there is flush surface contact between the latter. Heating is carried out of at least the second restricting surface 16 and a first restricting surface 22 on the first restricting body 18, so that the thermoplastic matrix material of the two components 2 and 4 is softened at least in edge regions 26 and 28 of the components 2, 4. The application of a heating power for the softening could be carried out by action of ultrasound, and electrical heating resistor, friction by rotation of a tool and/or of the mandrel 6 or using other, even externally arranged, devices. The aim is to soften the edge regions 26 and 28 in such a way that the mandrel 6 can be driven unimpeded through the openings 10 and 12 and can thereby displace softened material 24. The shape of the openings and 12 is thereby influenced and a desired common connecting opening is finally produced.

After the heating, the mandrel 6 is therefore initially moved into and through the first opening 10, in order subsequently to be driven into the second opening 12 so that the second cavity 14 is subsequently reached. Because of the softening of the material, displacement of the material takes place out of the edge region 26 of the first component 2 in the direction of the second component 4. This is only indicated here, and the representation is not true to scale. Because of the restricting bodies 8 and 18 adjacent to the components 2 and 4, material can be displaced arbitrarily by the mandrel 6, but is restricted to spreading and the available cavity between the restricting surfaces 16 and 22, by displacement of the softened material 24 present at another position, into the edge regions 26 and 28. The introduction of the mandrel 6 consequently leads to a modified distribution of the material.

After the mandrel 6 has been driven fully, a common connecting opening 30 is obtained in which the softened material of the second component 2 is pressed, for example in the shape of a ring or socket, into the second opening 12. With a sufficient temperature and compatibility of the materials of the components 2 and 4, the softened material of the two components 2 and 4 may join together with a material fit so that the two components 2 and 4 are welded to one another in the edge regions 26 and 28.

Figure 9:
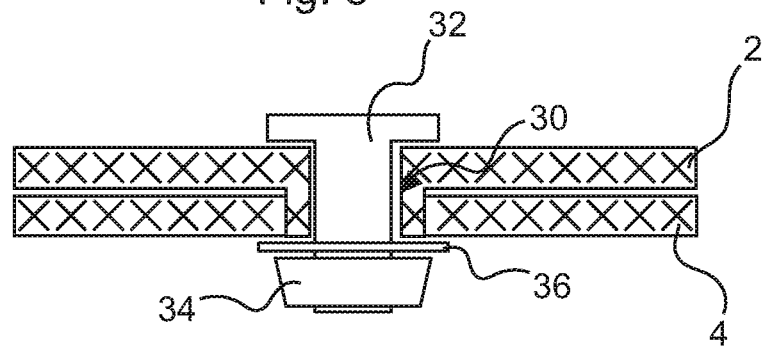
FIG. 9 shows the connecting opening with a connecting element inserted therein.

As represented in FIG. 9, after the connecting opening 30 has been prepared, a connecting means in the form of a bolt 32 having a nut 34 and a washer 36 may be applied on the connecting opening 30. Rivet connections may have of course also be envisaged, for instance with screw or blind rivets. As mentioned above, a connecting element may also be used as a mandrel. Furthermore, a rotation of the connecting element by friction may also lead to heating of the edge regions 26 and 28 and therefore softening of the material. If it is used as a mandrel in the context of the method, the connecting element may also remain in the common connecting opening 30 after the production thereof.

Figure 10:
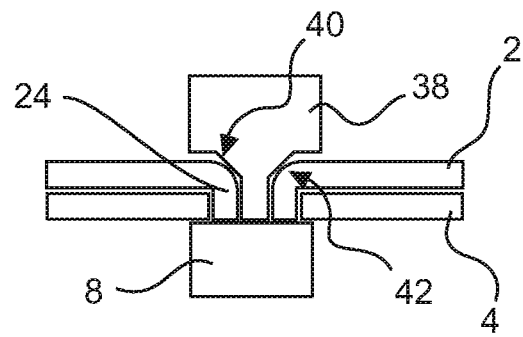
FIG. 10 shows a connecting element with one indentation in a lateral section.

For optional shaping of at least one axial end of the connecting opening 30, a mandrel 38, which is represented by way of example in FIG. 10, may be used. Instead of a continuously cylindrical shape, this has a widening lateral surface 40 which leads to an indentation 42 by pressing into or onto the first component 2. A die is therefore provided, which additionally defines the shape of an axial end surface of the common connecting opening. The merely schematically indicated second restricting body 8 may be configured as in the preceding figures.

Figure 11:
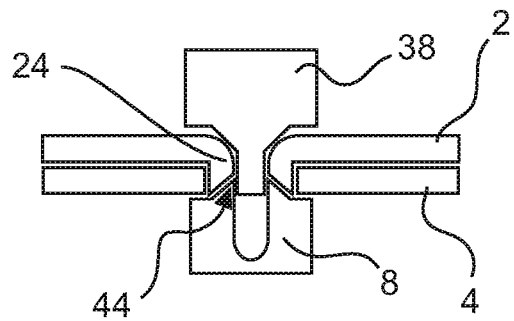
FIG. 11 shows a connecting element with two indentations in a lateral section.

As is furthermore represented in FIG. 11, it is also possible to use a second restricting body (not shown here) which has a similar contour for forming a further indentation 44 at an opposite axial end of the connecting opening.

In principle, in the procedure according to the invention, the selection of the sizes of the first opening 10, of the second opening 12 and of the mandrel is not entirely independent and freely selectable, but rather a constant volume of the material must also be taken into account during the insertion of the mandrel 6. As represented in FIGS. 12a and 12b, the first opening 10 has a first radius R1, and the second opening has a second radius R2. The mandrel 6 has a mandrel outer radius Rf. The radii R1, R2 and Rf are to be adapted to one another in such a way that, with a constant material thickness t1, t2, a flush surface contact is induced between the fully inserted mandrel 6 and inner edges of the openings 10 and 12. The volumes V1 and V2 defined by the openings 10 and 12 then correspond to a volume Vf occupied by the mandrel inside the two components 2 and 4 according to FIG. 12c.

As is noted in FIGS. 13a and 13b, additional volume Vc is of course also to be taken into account for optional indentations, if for example the mandrel 38 is used.

The connecting opening 30 formed in this way may, as shown in FIGS. 14a to 14d, be used to receive a very wide variety of connecting elements 46, 48, 50 and 52.

In addition, it is to be pointed out that the terms "comprise" and "comprising" do not exclude any other elements or steps, and "a" or "one" does not exclude a multiplicity. Furthermore, it is to be pointed at the features which have been described with reference to one of the exemplary embodiments above may also be used in combination with other features of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). The terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES 2 first component
4 second component
6 mandrel
8 second restricting body
10 first opening
12 second opening
14 second cavity
16 second restricting surface
18 first restricting body
20 first cavity
22 first restricting surface
24 softened material
26 first edge region
28 second edge region
30 common connecting opening
32 bolt, connecting element
34 nut
36 washer
38 mandrel
40 lateral surface
42 indentation
44 indentation
46 connecting element
48 connecting element
50 connecting element
52 connecting element
$R_1$ radius of the first opening
$R_2$ radius of the second opening
$R_f$ radius of mandrel
$V_1$ volume of first opening $V_2$ volume of second opening
$V_f$ volume of connecting opening
$V_c$ additional volume

The invention claimed is:

1. A method for producing a common connecting opening in two components, at least one of which is made from a plastically deformable material, comprising the steps:
providing a first component made of a plastically deformable material, the first component having a first opening, a first sidewall around the first opening, and a thickness at the first opening defined in an axial direction at the first sidewall,
providing a second component having a second opening, a second sidewall around the second opening, and a thickness at the second opening defined in the axial direction at the second sidewall,
assembling the first component and the second component so that the first opening and the second opening lie on one another,
enclosing the first component and the second component between a first restricting body and a second restricting body in an edge region around the respective opening,
softening the material at least of the edge region of the first component,
heating a mandrel,
introducing the mandrel into the first and second openings so that softened material moves between the two edge regions and surrounds the mandrel in order to provide a common connecting opening, and
setting the material,
the mandrel having an outer diameter which corresponds to a target diameter of the common connecting opening,
wherein the first opening has a first opening radius,
wherein the second opening has a second opening radius,
wherein the mandrel has a mandrel outer radius, and
wherein the first opening radius, the second opening radius and the mandrel outer radius are dimensioned in such a way that, when the mandrel is introduced and extends through the first opening and the second opening, the first component, the second component and the mandrel are in flush surface contact with one another, and a sum of the thickness at the first opening of the first component and the thickness at the second opening of the second component is unchanged.

2. The method according to claim 1, wherein the softening of the material comprises softening of the material of the edge regions of the first component and the second component.

3. The method according to claim 1, wherein the first opening has a smaller diameter than the second opening.

4. The method according to claim 1, wherein a mandrel outer diameter is greater than a diameter of the first opening and less than a diameter of the second opening.

5. The method according to claim 1, wherein the mandrel is driven from a cavity arranged in the first restricting body into a second cavity of the second restricting body.

6. The method according to claim 1, furthermore comprising the use of a connecting element as the mandrel, which remains in the common connecting opening after the setting of the material.

* * * * *